(12) United States Patent
Wu et al.

(10) Patent No.: US 10,384,941 B2
(45) Date of Patent: Aug. 20, 2019

(54) METHOD FOR PRODUCING SPHERICAL SILICON NITRIDE POWDER

(71) Applicant: NATIONAL CHUNG SHAN INSTITUTE OF SCIENCE AND TECHNOLOGY, Taoyuan (TW)

(72) Inventors: Chun-Te Wu, Taoyuan (TW); Kuan-Ting Lai, Taoyuan (TW); Cheng-Hung Shih, Taoyuan (TW); Yang-Kuo Kuo, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 15/839,995

(22) Filed: Dec. 13, 2017

(65) Prior Publication Data
US 2019/0177162 A1  Jun. 13, 2019

(51) Int. Cl.
*C01B 21/082* (2006.01)

(52) U.S. Cl.
CPC ........ *C01B 21/082* (2013.01); *C01B 21/0828* (2013.01); *C01P 2004/32* (2013.01)

(58) Field of Classification Search
None
See application file for complete search history.

(56) References Cited

U.S. PATENT DOCUMENTS

| 4,582,696 A | 4/1986 | Crosbie |
| 4,619,905 A * | 10/1986 | Natansohn .......... C01B 21/0685 |
| | | 423/344 |
| 8,697,023 B2 | 4/2014 | Schroll |
| 2014/0065050 A1 * | 3/2014 | Clemens ................ B82Y 30/00 |
| | | 423/344 |

FOREIGN PATENT DOCUMENTS

| TW | 200902439 A | 1/2009 |
| TW | 201343541 A | 11/2013 |

OTHER PUBLICATIONS

Pavarajarn et al.; Synthesis of Porous Silicon Nitride Using Silica/Carbon composite Derived From Phenol-Resorcinol-Formaldehyde Gel; Ceramics International; 42, 10879-10885; 2016.*

* cited by examiner

*Primary Examiner* — Guinever S Gregorio
(74) *Attorney, Agent, or Firm* — Schmeiser, Olsen & Watts, LLP

(57) ABSTRACT

A method utilizes easily obtained carbon as carbon source for sintering, followed by high energy ball milling process with planetary ball mill for high energy homogenous mixing of the carbon source, solvent and nano-level silicon dioxide powder, along with a high energy ball milling process repeatedly performed using different sized ball mill beads, so as to formulate a spray granulation slurry with the optimal viscosity, to complete the process of micronization of carbon source evenly encapsulated by silicon dioxide powders. The optimal ratio of $C/SiO_2$ is 1-2.5 to produce a spherical silicon dioxide powder (40-50 μm) evenly encapsulated by the carbon source. The powder is then subjected to a high temperature (1450□) sintering process under nitrogen gas. Lastly, the sintered silicon nitride powder is subjected to homogenizing carbon removal process in a rotational high temperature furnace to complete the fabricating process.

13 Claims, 4 Drawing Sheets

METHOD FOR PRODUCING SPHERICAL SILICON NITRIDE POWDER

FIELD OF THE INVENTION

The present invention relates to a method for producing a spherical silicon nitride powder, by adopting nano-level homogenizing carbon mixing technology to evenly encapsulate the starting material with carbon source, and spray granulation process to produce a micro-level silicon dioxide powder, as well as high temperature sintering process using nitrogen gas under normal pressure, coupled with rotational homogenizing carbon removal technology to complete the process of producing a micro-level spherical silicon nitride powder. The spherical structure of the silicon nitride powder has superior powder fluidity, increased bulk compactness and true density after mold formation to facilitate subsequent development silicon nitride substrates with anti-shock and pressure resistance characteristics in the fields of semiconductors, power elements, automobile electronics in Taiwan.

BACKGROUND OF THE INVENTION

Silicon nitride is mainly applied in high temperature materials. It has excellent high temperature strength, as well as other excellent properties such as heat resistant, corrosion resistant, wear resistant, anti-shock and pressure resistant. Moreover, its high mechanical strength can be compared with metal materials. Meanwhile, it is also a high functioning electrical insulating material that has great potential to be utilized in fields such as manufacturing cutting tools, ceramic bearings, refractory materials, high-frequency components and semiconductors.

Silicon nitride exists in α and β phases, which are both in hexagonal crystal system and have similar phase like unit cell. Generally, a phase silicon nitride is a low temperature type which is unstable and often contains traces of oxygen, the empirical formula of which is $Si_{12}N_{15}O_{0.5}$. β-silicon nitride is a product of higher temperature and low oxygen partial pressure. As such, when the temperature exceeds 1650☐, α-silicon nitride can transform directly to high length-diameter ratio column-like β-silicon nitride grains. The non-uniform distribution of such grains can create crack bridging, which is the main reason behind high-strength and high-toughness of the sintered silicon nitride. Theoretically, the density value of α-silicon nitride and β-silicon nitride is 3.18 and 3.19 g/cm3, respectively and a significant thermal decomposition of silicon nitride occurs at around 1800° C. under nitrogen gas at one atmosphere pressure. When silicon nitride is subjected to atmosphere or higher oxygen partial pressure, a protective layer of silicon dioxide is formed to inhibit oxidation reaction.

Several methods are employed in preparing silicon nitride powders in the industry, including: direct nitridation, chemical vapor deposition, imide thermal decomposition, combustion synthesis, carbothermal reduction and etc., wherein carbothermal reduction is the main method adopted in preparing silicon nitride in the industry. Carbothermal reduction involves solid phase mixing of silicon oxide or silicon dioxide powders with carbon sources and subjected to powder sintering process under nitrogen gas or ammonia gas at a high temperature furnace wherein carbothermal reduction process is carried out. The powder fabricated using such method are fine powders and also has the advantages of having even particle size, high purity and is capable of large scale production and thus besides direct nitridation process is also a primary method of producing silicon nitride powder in the industry.

The reaction for producing silicon nitride powder is listed below:

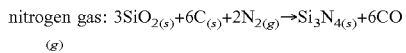
nitrogen gas: $3SiO_{2(s)}+6C_{(s)}+2N_{2(g)} \rightarrow Si_3N_{4(s)}+6CO_{(g)}$

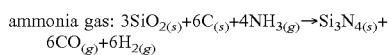
ammonia gas: $3SiO_{2(s)}+6C_{(s)}+4NH_{3(g)} \rightarrow Si_3N_{4(s)}+6CO_{(g)}+6H_{2(g)}$ ZHONG XIAN-LONG et al, Taiwan patent No. 1347299, entitled "Method for manufacturing [alpha] phase silicon nitride powder with high specific surface area" discloses a method for manufacturing [alpha] phase silicon nitride powder with high specific surface area, which is performed by using NH4NO3 which serves as oxidizing agent and glycine and urea which serve as fuels to carry out carbothermal combustion nitridation reaction to produce a reaction precursor powder (SiO2+C), however, as the carbon ratio between precursor and silicon dioxide is too low, sucrose is additionally added as a carbon source, lastly the obtained precursor is subjected to carbothermal reduction nitridation carried out in a column high temperature furnace under nitrogen gas.

SHIBATA KOJI et al., Taiwan patent No. I573757, entitled "Silicon nitride powder production method, silicon nitride powder, silicon nitride sintered body and circuit substrate using same" discloses a method to produce a silicon nitride powder with low oxygen content inside and an oxygen surface suitable for sintering, whereby thermal decomposition of nitrogen-containing silane compounds including silicon diimide, silicon tetramide, silicon chloroimide is carried out to obtain amorphous Si—N—H compound, and sintering process is carried out by placing the compounds in a continuous sintering furnace at a flow-state, under nitrogen gas at a temperature range from 1400-1700° C.

Crosbie, U.S. Pat. No. 4,582,696, entitled "Method of making a special purity silicon nitride powder" discloses a method of making high purity α-silicon nitride powder which involves a combustion reaction of tetraethyl orthosilicate and ammonia gas to produce an amorphous silicon powder and carbon black, followed by carbonthermal reduction nitridation at 1300-1500° C. under nitrogen gas, to produce a high purity α phase silicon nitride powder.

Schroll, U.S. Pat. No. 8,697,023, entitled "Method for producing high-purity silicon nitride" discloses a method of making high purity silicon nitride powder, which involves placing high purity silicon powder in a rotational column high temperature furnace, through controlling the mixing ratio among nitrogen gas, argon gas and hydrogen gas, a sintering process is carried out at 1100-1450° C. to complete nitridation reaction, so as to obtain high purity silicon nitride powders.

Commonly, direct nitridation process and carbothermal reduction are adopted as two primary methods to synthesize silicon nitride powders. However, direct nitridation process is both time consuming and power inefficient. Therefore, the present invention mainly adopts carbothermal reduction method to produce a silicon nitride powder. Carbothermal reduction mainly involves mixing silicon dioxide powder with carbon black and the carbonthermal reduction nitridation is carried out under nitrogen gas at 1500° C. However, it is difficult to evenly mix the silicon dioxide powder with the carbon black, which can undesirably result in incomplete carbothermal reduction nitridation of the powder and thereby leading to a problem with too much carbon residues, such that the time required for subsequent carbon removal process is prolonged. As such, the oxygen content of the silicon nitride is increased and the purity of which is decreased, thereby adversely affecting the block molding quality and reliability.

SUMMARY OF THE INVENTION

The main objective of the present invention is to provide a method for producing a spherical silicon nitride powder, comprising mixing source materials, spray drying, carbonization, carbothermal reduction, nitridation and carbon removal to produce a spherical silicon nitride powder with superior characteristics.

A spray granulation process is adopted in the present invention to carry out an atomization process of a silicon dioxide and carbon source mixed slurry using high speed rotation to produce a dry spherical powder. Such method is fast and has the advantage of directly controlling the powder diameter within the range of 40-50 μm. Through changing the parameters of rising temperature curve, it is possible to complete the process of carbonization, carbothermal reduction and nitridation at the same time, for producing a spherical silicon nitride powder with high purity.

Referring to FIG. 1 which is a method flow chart illustrating a method of preparing spherical silicon nitride powder in accordance with the present application, the method comprises: (A) dispersing and dissolving silicon dioxide powder and carbon source in a solvent, followed by a high energy ball milling process to form a evenly mixed slurry; (B) subjecting the mixed slurry to a spray granulation process, to form a spherical powder evenly encapsulated by the carbon source; (C) subjecting the spherical powder under nitrogen gas to undergo a carbonization treatment, to form a carbonization spherical powder; (D) under the environment of nitrogen gas, subjecting the carbonization spherical powder to carry out carbothermal reduction nitridation process, to form a spherical silicon nitride powder; (E) using a rotational high temperature furnace to carry out the homogenizing carbon removal process for the spherical silicon nitride powder after carbothermal reduction nitridation under the atmosphere to form a spherical silicon nitride powder with high purity The carbon source described in step (A) above is one selected from a group consisting of glucose, sucrose, phenol formaldehyde resin; the solvent is one selected from a group consisting of deionized water and ethanol; the temperature for the carbonization treatment in step (C) is 800° C.; the temperature for the carbothermal reduction nitridation in step (D) is 1450° C.; the temperature for the homogenizing carbon removal process in step (E) above is 800° C.

The present invention discloses a method for producing a spherical silicon nitride powder, with the following main features. Through spry drying the easily attainable carbon source and silicon dioxide powder to carry out the spherical granulation process, an evenly mixed micro-level spherical powder can be obtained. In addition, encapsulating the silicon dioxide powder evenly with the carbon source in advance to effectively increase the nitrification conversion rate in carbothermal reduction under nitrogen gas sintering process, so as to effectively reduce the usage of the carbon source. Moreover, the spherical structure of the silicon nitride powder has a superior powder fluidity, to increase bulk compactness and true density after mold formation to facilitate developing silicon nitride substrates with anti-shock and pressure resistance characteristics subsequently.

DETAILED DESCRIPTION OF THE PREFERRED EMBODIMENTS

A method of producing a spherical silicon nitride powder in accordance with the present invention features on using a combination of high energy ball milling process and spray granulation methods to evenly encapsulate the surface of a silicon dioxide powder with a carbon source, through a carbonization process for even mixing, and then a sintering process is carried out at a temperature of 1450° C. under nitrogen gas to complete carbothermal reduction nitridation process, for producing a spherical silicon nitride powder, then placing the sintered powder to a rotational high temperature furnace containing oxygen to carry out a homogenizing carbon removal process, so as to complete the process for producing a spherical silicon nitride powder with high purity. In the carbonthermal reduction nitridation, the carbon source encapsulating the surface of the silicon dioxide powder after carbonization serves as a reducing agent such that silicon dioxide is reduced by nitrogen gas and the reduced silicon reacts with nitrogen gas to form a silicon nitride powder.

Figure 1:
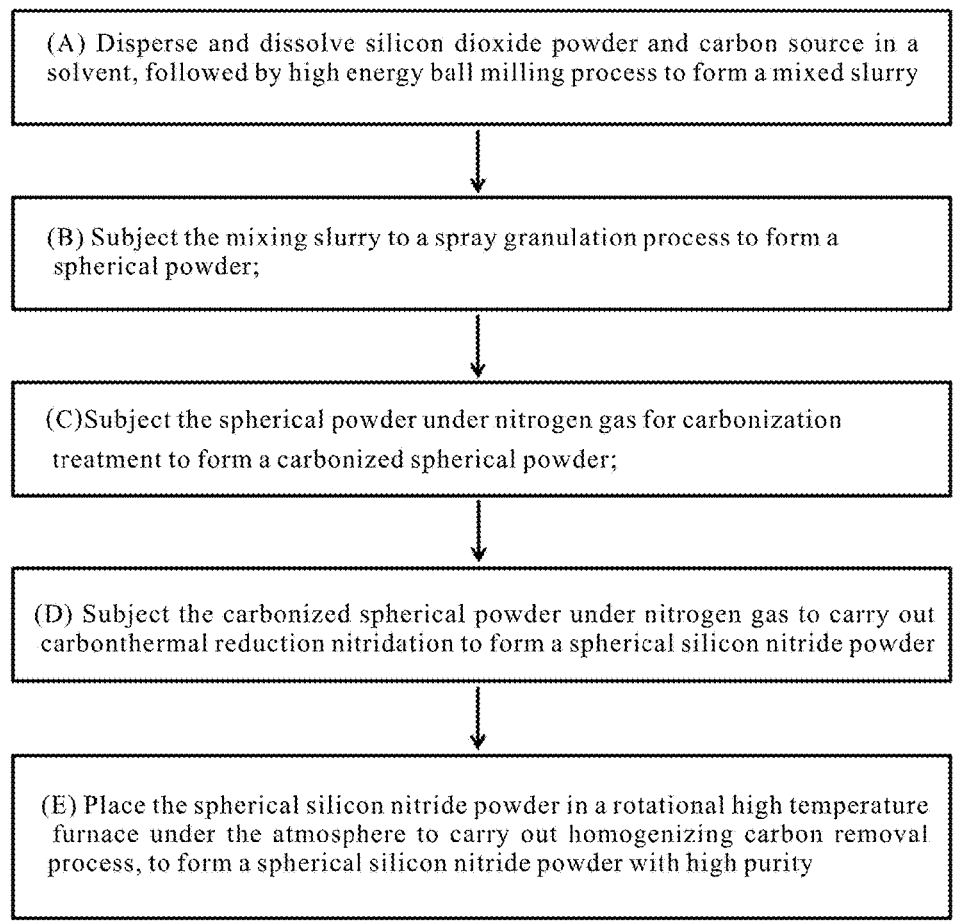
FIG. 1 is a method flow chart illustrating a method of preparing spherical silicon nitride powder in accordance with the present application.
Figure 2:
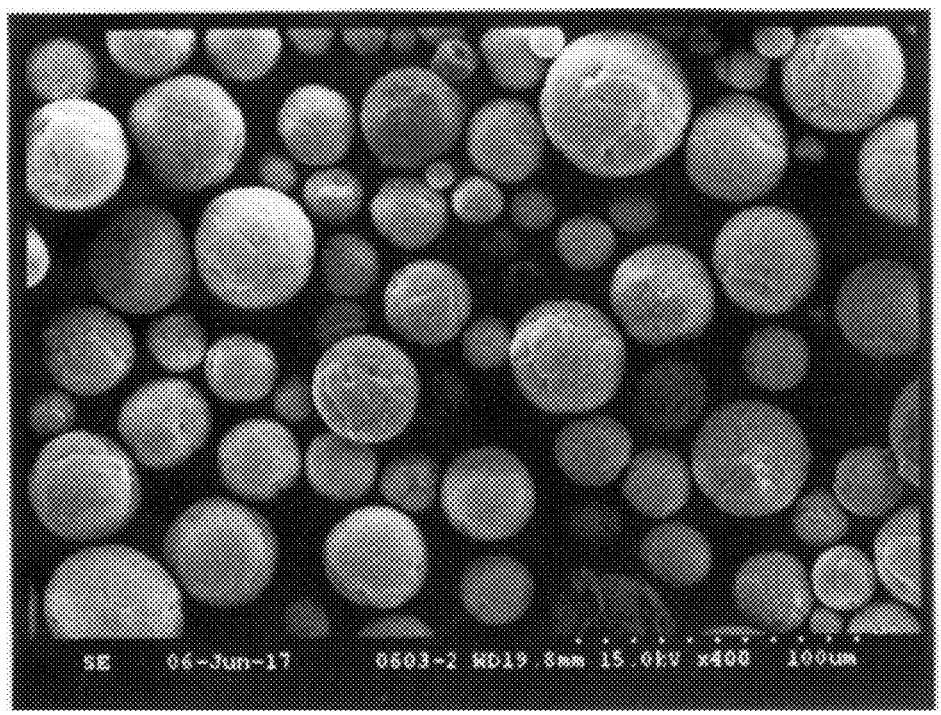
FIG. 2 is a Scanning Electron Microscopic diagram showing a spherical powder spray granulation process produced in accordance with the embodiments of the present application.
Figure 3:
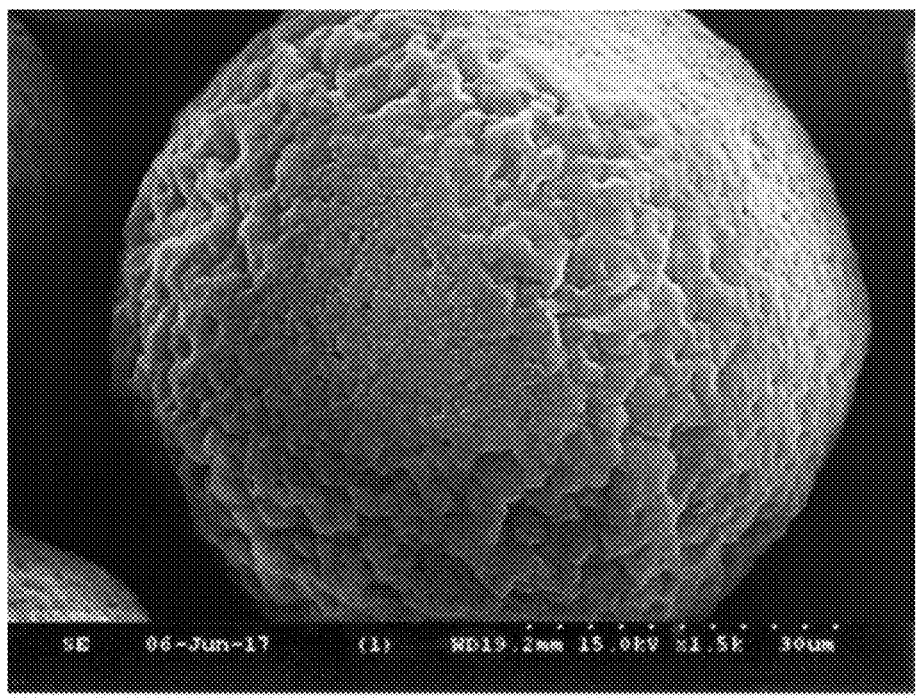
FIG. 3 is a Scanning Electron Microscopic diagram showing a spherical silicon nitride powder after carbonthermal reduction nitridation in accordance with the embodiments of the present application.
Figure 4:
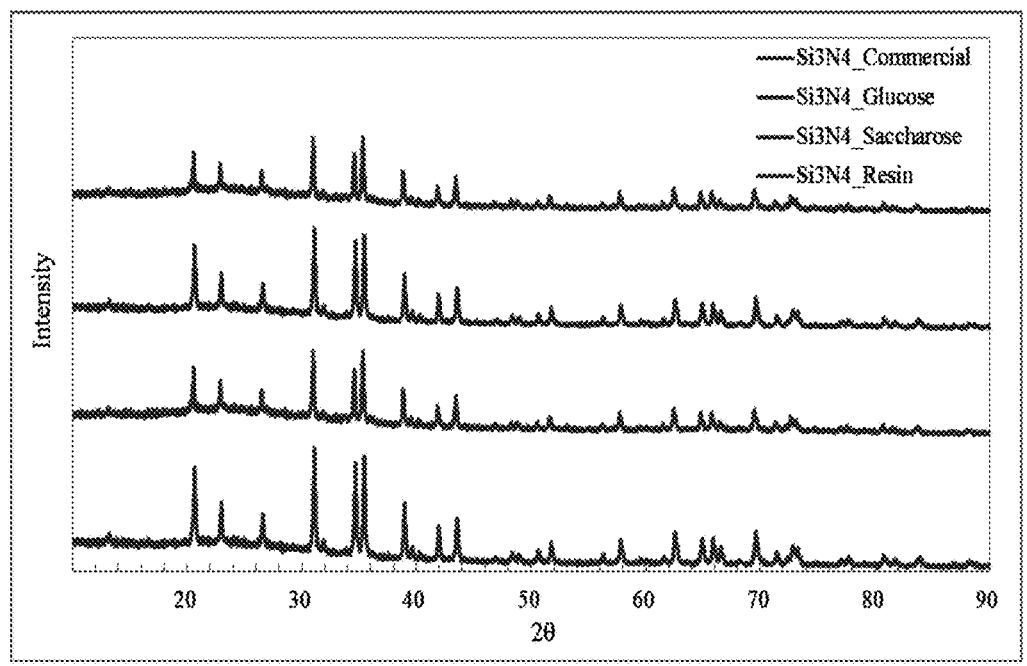
FIG. 4 is an X-ray powder diffraction diagram showing a spherical silicon nitride powder after carbonthermal reduction nitridation in accordance with the embodiments of the present application.

Example 1: 75 g of glucose was dissolved in 1500 mL deionized water, with an addition of 30 g of silicon dioxide powder, along with a high energy ball milling process repeatedly performed using different sized ball mill beads, so as to form an evenly mixed spray granulation slurry. Then, the mixed slurry is subjected to a spray drying process using an atomizer at a rotational speed of 15000 rpm to form a spherical silicon powder, encapsulated evenly by micronized carbon source. Referring to FIG. 2, a Scanning Electron Microscopic diagram showing a spherical powder spray granulation process produced in accordance with the embodiments of the present application is shown. As shown in the drawing, the powder after spray drying appears to be spherical with an average diameter measured to be 45.36 μm. The obtained spherical powder was then placed in a BN crucible for sintering process. First, a carbonization treatment was performed in a high-temperature furnace at 800° C. under nitrogen gas atmosphere for 2 hours to form a carbonized spherical powder. Then, the temperature is raised at a rate of 5° C./min to 1450° C., which is kept constant for 5 hrs. and a carbonthermal reduction nitridation is carried out under nitrogen gas in a high temperature furnace to produce a spherical silicon nitride powder. Referring to FIG. 3, a Scanning Electron Microscopic diagram showing a spherical silicon nitride powder after carbonthermal reduction nitridation in accordance with the embodiments of the present application is shown. As shown in the drawing, the powder after carbonthermal reduction nitridation is spherical shaped and is porous. Lastly, the sintered silicon nitride powder is subjected to 10 hrs. of homogenizing carbon removal process performed in a rotational high temperature furnace at 800° C. to complete the fabrication of producing spherical silicon nitride powder with high purity. Referring to FIG. 4, an X-ray powder diffraction diagram showing a spherical silicon nitride powder after carbonthermal reduction nitridation in accordance with the embodiments of the present application, wherein the weight ratio between silicon dioxide and glucose 1:2.5 is shown. As shown in the drawing, the fabricated powder of silicon nitride appears to be in α-crystal phase, thereby proofing that a spherical silicon nitride powder is produced.

Example 2: First, 60 g of sucrose was dissolved in 1500 mL deionized water, with an addition of 30 g of silicon dioxide powder, along with a high energy ball milling process repeatedly performed using different sized ball mill beads, so as to form an evenly mixed spray granulation slurry. Then, the mixed slurry is subjected to a spray drying process using an atomizer at a rotational speed of 15000 rpm to form a spherical silicon powder, encapsulated evenly by micronized carbon source with an average diameter of 43.27 μm. The obtained spherical powder was then placed in a BN crucible for sintering process. First, a carbonization treatment was performed in a high-temperature furnace at 800° C. under nitrogen gas for 2 hours to form a carbonized spherical powder. Then the temperature is raised at a rate of 5° C./min to 1450° C., which is kept constant for 5 hrs. and a carbonthermal reduction nitridation is carried out under nitrogen gas in a high temperature furnace to produce a spherical silicon nitride powder. Lastly, the sintered silicon nitride powder is subjected to 10 hrs. of homogenizing carbon removal process performed in a rotational high temperature furnace at 800° C. to complete the fabrication of producing spherical silicon nitride powder with high purity. Referring to FIG. 4, X-ray powder diffraction diagram showing a spherical silicon nitride powder carbonthermal reduction nitridation in accordance with the embodiments of the present application, wherein the weight ratio between silicon dioxide and glucose 1:2.0. As shown in the drawing, the fabricated powder of silicon nitride appears to be in α-crystal phase, thereby proofing that a spherical silicon nitride powder is produced.

Example 3: First, 30 g of phenol formaldehyde resin was dissolved in 1000 mL ethanol, with an addition of 30 g of silicon dioxide powder, along with a high energy ball milling process repeatedly performed using different sized ball mill beads, so as to form evenly mixed spray granulation slurry. Then, the mixed slurry is subjected to a spray drying process using an atomizer at a rotational speed of 15000 rpm to form a spherical silicon powder, encapsulated evenly by micronized carbon source with an average diameter of 46.21 μm. The obtained spherical powder was then placed in a BN crucible for sintering process. First, a carbonization treatment was performed in a high-temperature furnace at 800° C. under nitrogen gas atmosphere for 2 hours to form a carbonized spherical powder. Then the temperature is raised at a rate of 5° C./min to 1450° C., which is kept constant for 5 hrs. and a carbonthermal reduction nitridation is carried out under nitrogen gas in a high temperature furnace to produce a spherical silicon nitride powder. Lastly, the sintered silicon nitride powder is subjected to 10 hrs. of homogenizing carbon removal process performed in a rotational high temperature furnace at 800° C. to complete the fabrication of producing spherical silicon nitride powder with high purity. Referring to FIG. 4, X-ray powder diffraction diagram showing a spherical silicon nitride powder carbonthermal reduction nitridation in accordance with the embodiments of the present application, wherein the weight ratio between silicon dioxide and glucose 1:2.0. As shown in the drawing, the fabricated powder of silicon nitride appears to be in α-crystal phase, thereby proofing that a spherical silicon nitride powder is produced.

The present invention adopts spray granulation method coupled with carbothermal reduction nitridation method to produce a spherical silicon nitride powder. In comparison with conventional carbothermal reduction nitridation method, the present invention replaces carbon black with glucose/sucrose/phenol formaldehyde resin as a means of carbon source which can also be used as an adhesive, utilizes spray granulation process to produce a spherical powder and through changing the parameters of rising temperature curve of the high temperature sintering process, it is possible to complete the process of carbonization, carbothermal reduction and nitridation at the same time, to synthesize a spherical silicon nitride powder within the temperature range of 1450° C. In addition, spherical silicon nitride powder has superior powder fluidity, which can improve the bulk compactness and true density after mold formation, and reduce the drawback of pores caused by the particle bonding during the sintering reaction, so as to develop silicon nitride substrates with higher reliability. Therefore, the present invention has the advantages of simple process, omitting the use of additional additives, low production cost, less carbon source usage, etc., as well as the advantages of enhanced economic and energy efficiency, and can be applied to semiconductors, power components, automotive electronics and similar fields.

What is claimed is:
1. A method for producing a spherical silicon nitride powder, comprising the steps of:
(A) preparing a silicon dioxide powder and a carbon source, wherein the silicon dioxide powder and the carbon source are dispersed and dissolved in a solvent to form mixed slurry, wherein the viscosity of the mixed slurry is 50 cP;
(B) subjecting the mixing slurry to a spray granulation process, to form a spherical powder;
(C) subjecting the spherical powder under nitrogen gas for carbonization treatment, to form a carbonized spherical powder;
(D) subjecting the carbonized spherical powder under nitrogen gas to carry out carbonthermal reduction nitridation, to form a spherical silicon nitride powder;
(E) placing the spherical silicon nitride powder in a rotational high temperature furnace under the atmosphere to carry out homogenizing carbon removal process, to form a spherical silicon nitride powder with high purity.

2. The method for producing a spherical silicon nitride powder of claim 1, wherein the carbon source is one selected from a group consisting of glucose, sucrose or phenol formaldehyde resin.

3. The method for producing a spherical silicon nitride powder of claim 1, wherein the solvent is one selected from a group consisting of deionized water or ethanol.

4. The method for producing a spherical silicon nitride powder of claim 1, wherein the weight ratio between silicon dioxide powder and the glucose is 1:2.5.

5. The method for producing a spherical silicon nitride powder of claim 1, wherein the weight ratio between silicon dioxide powder and the sucrose is 1:2.0.

6. The method for producing a spherical silicon nitride powder of claim 1, wherein the weight ratio between silicon dioxide powder and the phenol formaldehyde resin 1:1.0.

7. The method for producing a spherical silicon nitride powder of claim 1, wherein the mixing method in the step (A) is ball milling.

8. The method for producing a spherical silicon nitride powder of claim 1, wherein spray granulation process (carbon source: glucose) in the step (B) is carried out by a water based method, wherein the atomizer has a rotational speed controlled at 15000 rpm, a frequency of a circulation fan controlled at 40 Hz, temperature inlet at 160° C., temperature outlet 100° C., feeding speed controlled at 20 ml/min.

9. The method for producing a spherical silicon nitride powder of claim 1, wherein the spray granulation process (carbon source: sucrose) in the step (B) is carried out by a water based method, wherein the atomizer has a rotational speed controlled at 15000 rpm, a frequency of a circulation fan controlled at 40 Hz, temperature inlet at 180° C., temperature outlet 100° C., feeding speed controlled at 20 ml/min.

10. The method for producing a spherical silicon nitride powder of claim 1, wherein the step (B)spray granulation process (carbon source: phenol formaldehyde resin) is carried out by a solvent based method, wherein the atomizer has a rotational speed controlled at 15000 rpm, a frequency of a circulation fan controlled at 40 Hz, temperature inlet at 100° C., temperature outlet 80° C., feeding speed controlled at 20 ml/min.

11. The method for producing a spherical silicon nitride powder of claim 1, wherein in the step (C), the carbonization treatment temperature ranges from 700-800° C.

12. The method for producing a spherical silicon nitride powder of claim 1, wherein in the step (D), the carbonthermal reduction nitridation temperature ranges from 1400-1500° C.

13. The method for producing a spherical silicon nitride powder of claim 1, wherein in the step (E), the homogenizing carbon removal process temperature ranges from 700-800° C.

* * * * *